(12) United States Patent
S et al.

(10) Patent No.: US 11,821,352 B2
(45) Date of Patent: Nov. 21, 2023

(54) DEVICE AND METHOD FOR RAM AIR TREATMENT OF A VEHICLE COOLING SYSTEM

(71) Applicant: VOLVO TRUCK CORPORATION, Gothenburg (SE)

(72) Inventors: Manoj Kumar S, Bangalore Karnataka (IN); Shital Dubey, Bangalore (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/048,305

(22) Filed: Oct. 20, 2022

(65) Prior Publication Data
US 2023/0127953 A1 Apr. 27, 2023

(30) Foreign Application Priority Data

Oct. 21, 2021 (EP) ..................................... 21203904

(51) Int. Cl.
*F01P 5/06* (2006.01)
*B60K 11/08* (2006.01)
*F01P 7/02* (2006.01)

(52) U.S. Cl.
CPC .............. *F01P 5/06* (2013.01); *B60K 11/085* (2013.01); *F01P 7/02* (2013.01); *F01P 2025/42* (2013.01)

(58) Field of Classification Search
CPC .. F01P 5/06; F01P 7/02; F01P 2025/42; F01P 2025/66; F01P 2025/13; F01P 2025/06; B60K 11/08; B60K 11/085
See application file for complete search history.

(56) References Cited

U.S. PATENT DOCUMENTS

| | | | |
|---|---|---|---|
| 9,376,010 B2 | 6/2016 | Nam et al. | |
| 2002/0170507 A1* | 11/2002 | Stauder | F01P 7/08 123/41.04 |
| 2006/0102399 A1* | 5/2006 | Guilfoyle | B60K 11/085 180/68.1 |

FOREIGN PATENT DOCUMENTS

DE 102018102302 A1 8/2018

OTHER PUBLICATIONS

European Search Report and Written Opinion in corresponding European Application No. 21203904.4 dated Apr. 27, 2022 (7 pages).

* cited by examiner

*Primary Examiner* — Jacob M Amick
(74) *Attorney, Agent, or Firm* — Venable LLP; Jeffri A. Kaminski

(57) ABSTRACT

The invention relates to a cooling system for a vehicle, the cooling system comprising a cooling fan comprising a ram air turbine disposed in an aperture of a fan shroud, the fan shroud comprising:
an opening,
a shutter mechanism movable between a closed position in which it closes the opening, and an open position in which it opens the opening so that a ram air flow can pass through the opening, wherein the fan shroud further comprises:
a velocity sensor configured to measure ram air flow velocity,
a temperature sensor configured to measure ram air flow temperature, and
an actuator configured to move the shutter mechanism between the closed position and the open position based on measured ram air flow velocity and measured ram air flow temperature.

17 Claims, 3 Drawing Sheets

DEVICE AND METHOD FOR RAM AIR TREATMENT OF A VEHICLE COOLING SYSTEM

TECHNICAL FIELD

The invention relates to a device for ram air treatment of a vehicle cooling system, a method for ram air treatment of a vehicle cooling system, and an engine cooling system comprising a device for ram air treatment.

The invention can be applied in heavy-duty vehicles, such as trucks, buses and construction equipment. Although the invention will be described with respect to a heavy-duty vehicle, the invention is not restricted to this particular vehicle, but may also be used in other vehicles such as passenger vehicles.

BACKGROUND

Engine cooling systems of a vehicle generally comprise a cooling fan configured to produce an air flow through a heat exchanger such as an engine radiator, a condenser, or an intercooler, to cool the engine. More precisely, the cooling fan comprises a fan shroud with an air passage comprising fan blades configured to generate the air flow.

The air flow is usually called ram air flow.

When the vehicle speed raises, the velocity of the ram air relative to the vehicle increases. Therefore, the velocity of the ram air flow of the engine cooling system increases and hot spots can be created within the ram air flow. Hence, the cooling performance of the engine cooling system of the vehicle is reduced. The performances of the engine of the vehicle are then lowered and the vehicle emits more $CO_2$. More precisely, hot spots are generally created on the fan shroud area.

It is known to reduce these hot spots by arranging a ram air shutter assembly on the fan shroud of the cooling fan. The ram air shutter assembly generally comprises an opening in the fan shroud and a shutter disposed into the opening, the shutter being movable between a closed position where it closes the opening and an open position where it opens the opening so that ram air flow can pass through the opening. Hence, when the ram air flow velocity is greater than a predetermined value, the shutter can be switched in its open position to enable ram air to flow through the opening and avoid hot spots formation on the cooling system.

For instance, the shutter can be movable by the interaction of ram air due to dynamic pressure effects. The ram air shutter assembly can comprise a pressure sensor. The shutter is opened depending on the pressure measured by the pressure sensor.

Moreover, it is known to have a ram air shutter assembly comprising a device for automated actuation of closure.

However, these known ram air shutter assembly will not be as efficient over the time. Moreover, there is a room for improvement in controlling the opening and closing of the shutter.

SUMMARY

An object of the invention is to provide a device and a method for ram air treatment, which device and method solve at least the previous problem of the prior art.

According to a first aspect of the invention, the object is achieved by a device according to claim 1.

By the provision of a cooling system which comprises an actuator configured to move a shutter mechanism between a closed position and an open position based on ram air flow velocity and ram air flow temperature respectively measured by a velocity sensor and a temperature sensor, the cooling performances of the cooling system are improved. Therefore, fuel consumption is reduced, engine performance is increased and $CO_2$ emissions are reduced. Moreover, the cooling system of the invention allows better control live monitoring of the shutter mechanism.

According to one embodiment, the cooling system comprises two openings.

According to another embodiment, the cooling system comprises four openings.

According to one embodiment, the shutter mechanism is a deflector.

According to one embodiment, the shutter mechanism comprises a grill and a flap configured to at least partially cover the grill.

According to one embodiment, the shutter mechanism is movable between different opening angles.

More precisely, the shutter mechanism is movable between different opening angles, depending on ram air flow velocity and ram air flow temperature respectively measured by the velocity sensor and the temperature sensor.

According to a second aspect of the invention, the object is achieved by a vehicle according to claim 7.

According to a third aspect of the invention, the object is achieved by a method according to claim 8.

According to one embodiment, the step of opening the shutter mechanism is performed if the measured ram air flow velocity is greater than or equal to a velocity threshold and if the measured ram air flow temperature is greater than or equal to a temperature threshold.

According to one embodiment, the step of measuring ram air flow temperature is performed if the measured ram air flow velocity is greater than or equal to the velocity threshold.

According to one embodiment, the steps of measuring ram air flow velocity and measuring ram air flow temperature are performed simultaneously.

According to one embodiment, the step of measuring ram air flow temperature is performed continuously.

According to one embodiment, the method further comprises a step of closing the shutter mechanism via the actuator if the measured ram air temperature is below the temperature threshold.

According to one embodiment, the velocity threshold is about 10 km/h, and the temperature threshold is about natural ambient temperature.

According to one embodiment, the greater the ram air flow velocity and/or the ram air flow temperature are, the greater the opening angle is.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the Drawings.

DETAILED DESCRIPTION OF EXAMPLE EMBODIMENTS OF THE INVENTION

Figure 1:
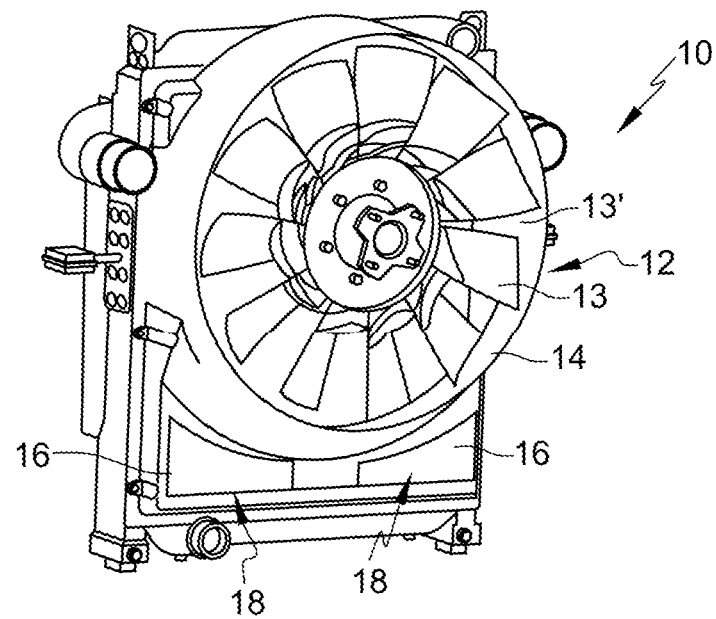
FIG. 1 is a schematic perspective view of a cooling system according to one embodiment the invention.
Figure 2:
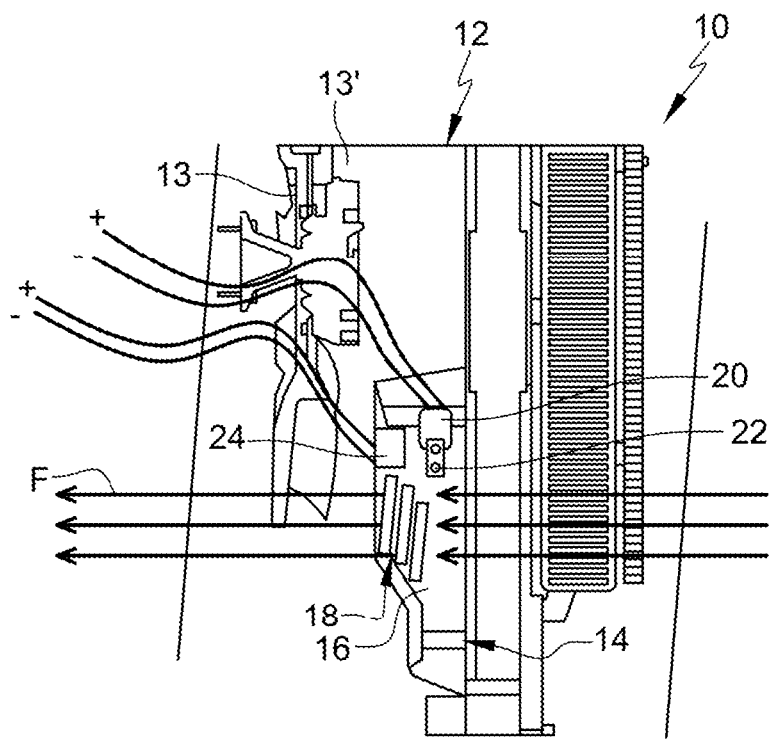
FIG. 2 is schematic cross-sectional view of the cooling system according to one embodiment the invention.
Figure 3:
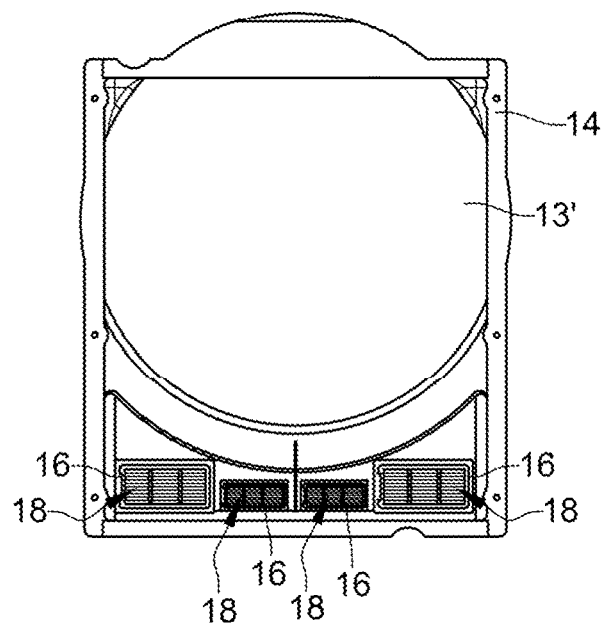
FIG. 3 is a schematic view of the fan shroud of the cooling system according to one embodiment of the invention.

FIGS. 1, 2 and 3 show a cooling system 10 comprising a cooling fan 12. The cooling fan 12 comprises a ram air turbine 13 disposed in an aperture 13' of a fan shroud 14.

The fan shroud 14 comprises an opening 16 and a shutter mechanism 18 movable between a closed position in which it closes the opening 16 (FIG. 1), and an open position in which it opens the opening 16 (FIG. 2) so that a ram air flow F can pass through the opening 16. The shutter mechanism 18 allows ram air treatment in order to improve cooling performances of the cooling system, and therefore reduce fuel consumption, increase engine performance and reduce $CO_2$ emissions.

Moreover, the fan shroud 14 comprises a velocity sensor 20, a temperature sensor 22, and an actuator 24. The velocity sensor 20 is configured to measure ram air flow velocity. The temperature sensor 22 is configured to measure the ram air flow temperature. The actuator 24 is configured to move the shutter mechanism 18 between the closed position (FIG. 1) and the open position (FIG. 2) based on measured ram air flow velocity and measured ram air flow temperature.

More precisely, the fan shroud 14 can comprises several openings 16. For instance, as illustrated in FIG. 1, the fan shroud 14 can comprise two openings 16. In alternative, as illustrated in FIG. 3, the fan shroud can comprise four openings 16.

Figure 4:
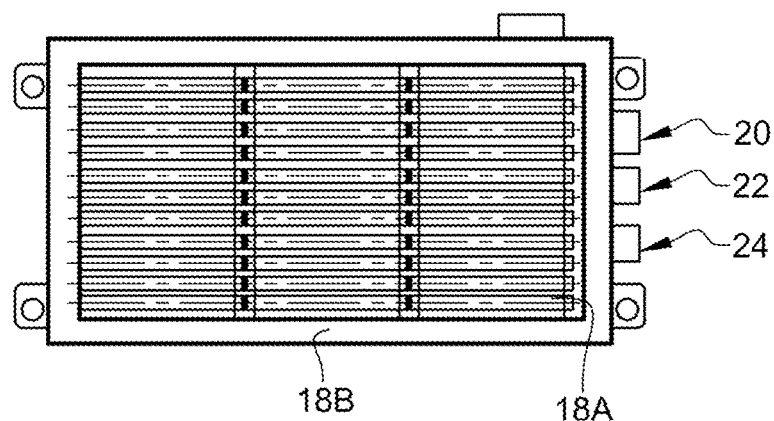
FIG. 4 is a schematic view of a shutter mechanism of the cooling system according to one embodiment the invention.
Figure 5:
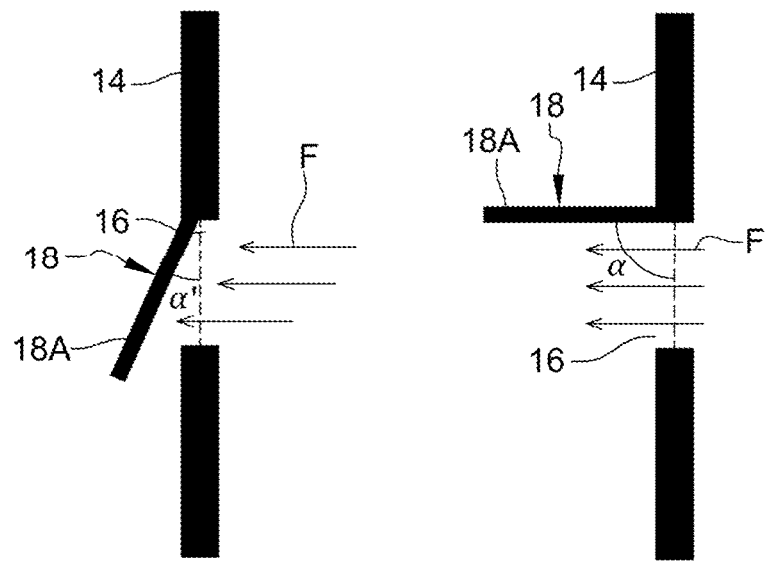
FIG. 5 is a schematic cross-sectional view of the shutter mechanism of FIG. 4, illustrating the shutter mechanism partially open.

As illustrated in FIGS. 4 and 5, the shutter mechanism 18 can comprise a flap 18A configured to at least partially cover the opening 16.

Moreover, FIG. 4 shows that the shutter mechanism 18 can comprise a grill 18B covering the opening 16. The flap 18A is configured to at least partially cover the grill 18B.

The shutter mechanism 18 can be a deflector.

As illustrated in FIG. 5, the shutter mechanism 18 can be movable between different opening angles α, for example depending on ram air flow velocity and ram air flow temperature respectively measured by the velocity sensor 20 and the temperature sensor 22. The different opening angles α can be variable between 90° (fully open) and 0° (fully closed).

Figure 6:
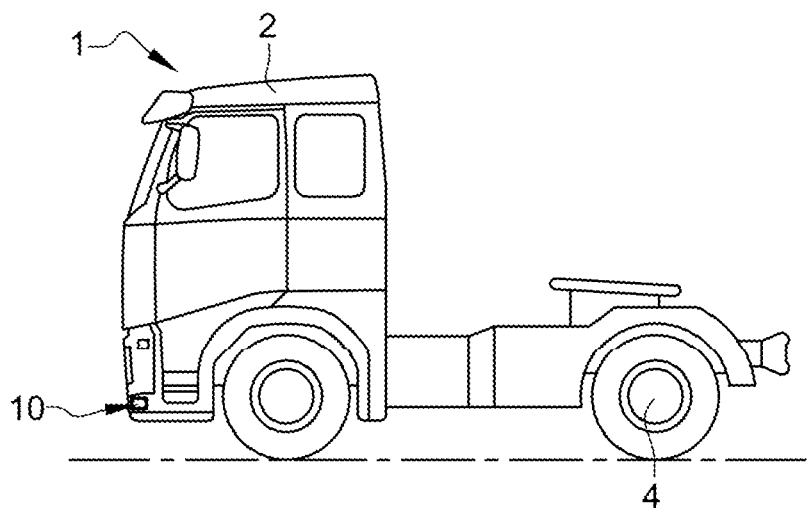
FIG. 6 is a schematic view of a vehicle comprising a cooling system according to the invention.

FIG. 6 illustrates a vehicle 1 comprising a cab 2 in which a driver may operate the vehicle 1. The vehicle 1 comprises a number of road wheels 4, herein illustrated as two pairs of wheels. The vehicle 1 comprises a cooling system 10 as illustrated above.

The vehicle 1 may have a propulsion device (not shown in FIG. 1) configured to generate a propulsion power for the vehicle 1. The propulsion device may for instance be an internal combustion engine, a battery-powered electric motor, or a motor powered by fuel cells. The cooling system 10 may be configured to cool the propulsion device.

Figure 7:
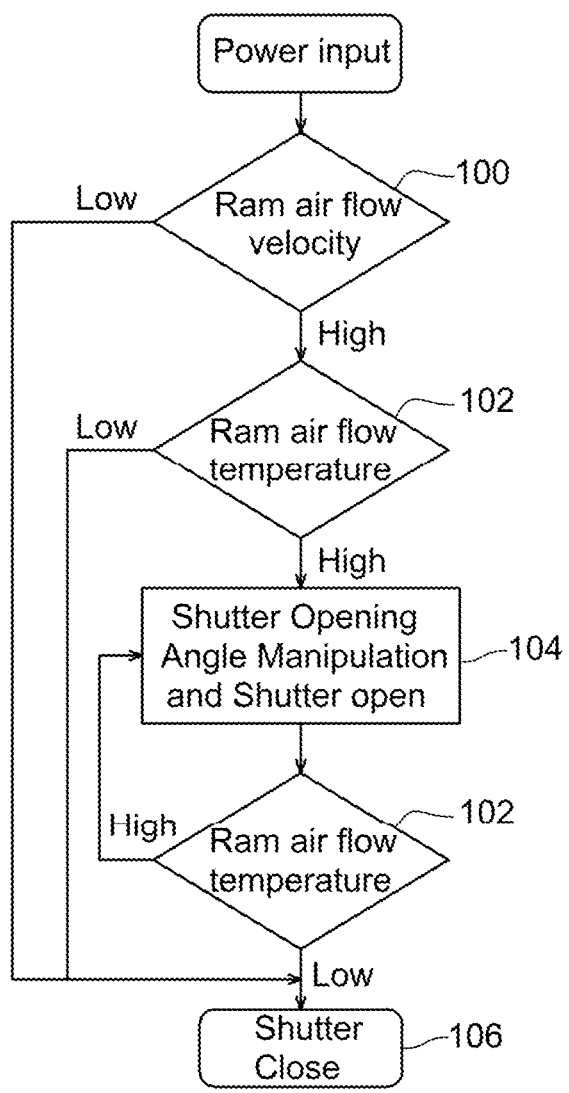
FIG. 7 is a diagram illustrating a method for ram air treatment according to the invention.

FIG. 7 shows a method for ram air treatment of a cooling system 10 as described above.

The method comprises the steps of:
measuring ram air flow velocity 100 via the velocity sensor 20,
measuring ram air flow temperature 102 via the temperature sensor 22, and
opening 104 the shutter mechanism 18 via the actuator 24, according to the measured ram air flow velocity and the measured ram air flow temperature.

More precisely, the step of opening 104 the shutter mechanism 18 is performed if the measured ram air flow velocity is greater than or equal to a velocity threshold and if the measured ram air flow temperature is greater than or equal to a temperature threshold.

For instance, the velocity threshold is about . . . and the temperature threshold is about . . . .

According to one embodiment, the step of measuring ram air flow temperature 102 is performed if the measured ram air flow velocity is greater than or equal to the velocity threshold.

Therefore, when the measured ram air flow velocity is greater than or equal to the velocity threshold, and when the measured ram air flow temperature is greater than or equal to the temperature threshold, the actuator 24 drives the shutter mechanism 18 in the open position.

According to this embodiment, the method first comprises the step of measuring ram air flow velocity 100. At this step, the velocity sensor 20 measures the ram air flow velocity. If the measured ram air flow velocity is inferior to the velocity threshold, the shutter mechanism 18 remain closed.

If the measured ram air flow velocity is greater than or equal to the velocity threshold, the temperature sensor 22 measures the ram air flow temperature during the step of measuring ram air flow temperature 102. If the measured ram air flow temperature is inferior to the temperature threshold, the shutter mechanism 18 remain closed.

If the measured ram air flow temperature is greater than or equal to the temperature threshold, the actuator 24 drives the shutter mechanism 18 in the open position.

According to another embodiment, the steps of measuring ram air flow velocity 100 and measuring ram air flow temperature 102 can be performed simultaneously.

The step of measuring ram air flow temperature 102 can be performed on a regular basis, such as every . . . minutes.

The method can comprise a step of closing 106 the shutter mechanism 18 via the actuator 24 if the measured ram air temperature is below the temperature threshold.

According to one embodiment, the greater the measured ram air flow velocity and/or the measured ram air flow temperature are, the greater the opening angle α is.

For instance, if the ram air flow is in range from 10 km/h to vehicle maximum speed, and the ram air temperature is in range from natural ambient temperature to 60° C., the opening angle α is in range from 10° to 90°. More precisely, if the ram air flow is equal to 10 km/h and the ram air temperature is equal to natural ambient temperature, the opening angle α is about 10°. Moreover, if the ram air flow is equal to 130 km/h and the ram air temperature is equal to 35° C., the opening angle α is about 90°.

It is to be understood that the present invention is not limited to the embodiments described above and illustrated in the drawings; rather, the skilled person will recognize that many changes and modifications may be made within the scope of the appended claims.

The invention claimed is:

1. A cooling system for a vehicle, the cooling system comprising:
a fan shroud having an aperture and an opening, the opening being spaced apart from the aperture,
a cooling fan comprising a ram air turbine disposed in the aperture of the fan shroud, a shutter mechanism movable between a closed position in which it closes the opening of the fan shroud, and an open position in which it opens the opening so that of the fan shroud to allow a ram air flow to pass through the opening, a velocity sensor configured to measure ram air flow velocity, a temperature sensor configured to measure ram air flow temperature, and an actuator configured to move the shutter mechanism between the closed position and the open position based on a measured ram air flow velocity and a measured ram air flow temperature.

2. A cooling system according to claim 1, wherein the fan shroud has two openings.

3. A cooling system according to claim 1, wherein the fan shroud has four openings.

4. A cooling system according to claim 1, wherein the shutter mechanism is a deflector.

5. A cooling system according to claim 1, wherein the shutter mechanism comprises a grill and a flap configured to at least partially cover the grill.

6. A cooling system according to claim 1, wherein the shutter mechanism is movable between different opening angles.

7. A vehicle comprising the cooling system according to claim 1.

8. A method for ram air treatment of the cooling system according to claim 1, the method comprising:

measuring ram air flow velocity via the velocity sensor, measuring ram air flow temperature via the temperature sensor, opening the shutter mechanism via the actuator, according to the measured ram air flow velocity and the measured ram air flow temperature.

9. A method for ram air treatment according to claim 8, wherein opening the shutter mechanism is performed if the measured ram air flow velocity is greater than or equal to a velocity threshold and if the measured ram air flow temperature is greater than or equal to a temperature threshold.

10. A method for ram air treatment according to claim 9, wherein measuring ram air flow temperature is performed if the measured ram air flow velocity is greater than or equal to the velocity threshold.

11. A method for ram air treatment according to claim 8, wherein measuring ram air flow velocity and measuring ram air flow temperature are performed simultaneously.

12. A method for ram air treatment according to claim 8, wherein measuring ram air flow temperature is performed continuously.

13. A method for ram air treatment according to claim 9, further comprising closing the shutter mechanism via the actuator if the measured ram air temperature is below the temperature threshold.

14. A method for ram air treatment according to claim 9, wherein the velocity threshold is about 10 km/h, and the temperature threshold is about natural ambient temperature.

15. A method for ram air treatment according to claim 8, wherein the greater are the ram air flow velocity and/or the ram air flow temperature, the greater is the opening angle.

16. A cooling system according to claim 1, wherein the actuator is configured to move the shutter mechanism to the open position when the measured ram air flow velocity is greater than or equal to a threshold velocity or when the measured ram air flow temperature is greater than or equal to a threshold temperature, or both.

17. A method for ram air treatment of a cooling system, the cooling system comprising:

a fan shroud having an aperture and an opening, the opening being spaced apart from the aperture, a cooling fan comprising a ram air turbine disposed in the aperture of the fan shroud, a shutter mechanism movable between a closed position in which it closes the opening of the fan shroud, and an open position in which it opens the opening of the fan shroud to allow a ram air flow to pass through the opening, a velocity sensor configured to measure ram air flow velocity, a temperature sensor configured to measure ram air flow temperature, and an actuator configured to move the shutter mechanism between the closed position and the open position based on a measured ram air flow velocity and a measured ram air flow temperature, the method comprising:

measuring ram air flow velocity via the velocity sensor, measuring ram air flow temperature via the temperature sensor, opening the shutter mechanism via the actuator, according to the measured ram air flow velocity and the measured ram air flow temperature, wherein opening the shutter mechanism is performed if the measured ram air flow velocity is greater than or equal to a velocity threshold and if the measured ram air flow temperature is greater than or equal to a temperature threshold, and wherein measuring ram air flow temperature is performed if the measured ram air flow velocity is greater than or equal to the velocity threshold.

* * * * *